United States Patent
Taniguchi et al.

(10) Patent No.: US 8,163,994 B2
(45) Date of Patent: Apr. 24, 2012

(54) FIXING STRUCTURE FOR ELECTRICAL JUNCTION BOX AND CASSETTE

(75) Inventors: Takayuki Taniguchi, Yokkaichi (JP); Takeshi Yomura, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 649 days.

(21) Appl. No.: 12/314,817

(22) Filed: Dec. 17, 2008

(65) Prior Publication Data

US 2009/0218129 A1  Sep. 3, 2009

(30) Foreign Application Priority Data

Feb. 29, 2008  (JP) ................................. 2008-050704

(51) Int. Cl.
*H02G 3/08* (2006.01)
(52) U.S. Cl. ........... 174/50; 174/59; 174/559; 439/76.1; 439/76.2; 439/949
(58) Field of Classification Search ............... 174/50, 174/17 R, 520, 59, 503, 559, 561, 560, 562; 439/76.1, 76.2, 949, 535, 563, 573, 701, 439/532, 718, 717; 361/600, 601, 679.01, 361/730, 740, 752
See application file for complete search history.

(56) References Cited

U.S. PATENT DOCUMENTS

| | | | | |
|---|---|---|---|---|
| 5,295,870 A | * | 3/1994 | Rei et al. ....................... | 439/717 |
| 5,507,077 A | * | 4/1996 | Kotajima ....................... | 439/532 |
| 5,545,056 A | * | 8/1996 | Yamaguchi ..................... | 439/532 |
| 5,837,938 A | * | 11/1998 | Sakamoto ....................... | 439/718 |
| 5,915,978 A | * | 6/1999 | Hayakawa et al. ............ | 439/76.2 |
| 6,196,882 B1 | | 3/2001 | Sato et al. | |
| 6,659,792 B2 | * | 12/2003 | Saka et al. ....................... | 174/59 |
| 6,753,472 B2 | * | 6/2004 | Ito ................................... | 174/50 |
| 6,786,740 B2 | | 9/2004 | Ito | |
| 7,670,184 B2 | * | 3/2010 | Akahori et al. .............. | 439/76.2 |

FOREIGN PATENT DOCUMENTS

| | | |
|---|---|---|
| JP | A-2003-333728 | 11/2003 |
| JP | A-2007-097322 | 4/2007 |

* cited by examiner

*Primary Examiner* — Angel R Estrada
(74) *Attorney, Agent, or Firm* — Oliff & Berridge, PLC

(57) ABSTRACT

A fixing structure for an electrical junction box and a cassette, the fixing structure being adapted to fix the cassette on a side wall outer surface of the electrical junction box. A locking portion is provided on an outer surface of the cassette. A rib plate that extends in a vertical direction and projects downward adjacent to the locking portion to come into contact with the side wall outer surface. A counterpart locking portion to be locked on the locking portion is provided on the side wall outer surface. An engaging stepped-portion receives a lower end of the rib plate. When the locking portion and the counterpart locking portion are coupled to and locked on one another, the rib plate comes into contact with the side wall outer surface, and a lower end of the rib plate comes into contact with the engaging stepped-portion to restrict rotation of the cassette.

15 Claims, 7 Drawing Sheets

FIXING STRUCTURE FOR ELECTRICAL JUNCTION BOX AND CASSETTE

CROSS-REFERENCE TO RELATED APPLICATION

This application claims priority from Japanese Patent Application No. 2008-050704 filed on Feb. 29, 2008, the entire disclosure of which is incorporated herein by reference.

BACKGROUND

The present invention relates to a fixing structure for an electrical junction box and a cassette.

Recently, an additional electrical junction box such as a relay box and a fuse box has been required as a cassette for an optional specification and has been attached to an exterior of an electrical junction box to be mounted on a motor vehicle.

In order to couple the cassette to the electrical junction box, locking portions and counterpart locking portions provided on exteriors of the electrical junction box and cassette are coupled to and locked on each other. In many cases, one to three coupled portions are provided between the electrical junction box and the cassette, as shown in JP-A-2003-333728, which is an example of a single point fixing structure. In the case of providing two or three coupled portions, the coupled portions are almost always disposed on the same horizontal line.

As illustrated in FIGS. 7A to 7C, a single hook 1a is integrally provided on an additional electrical junction box 1 so that the hook 1a can be engaged with a side wall of a junction box body 2. The hook 1a is slidably fitted in a receiving portion 2a provided on the junction box body 2. A relay 3 is inserted downward into the additional electrical junction box 1 with the additional electrical junction box being coupled to the junction box body 2.

SUMMARY

However, as described above, since the coupled portions of JP-A-2003-33728 between the junction box body 2 and the additional electrical junction box 1 are supported by a single point fixing, the coupled portion is weak against the vertical vibrations or the downward loads. Consequently, the additional electrical junction box 1 is pushed down about the coupled position upon insertion of a relay 3, thereby causing a possibility of breaking the receiving portion 2a and hook 1a.

Furthermore, in the case of providing one or two coupled portion or portions, the cassette can be swung about the coupled portion or portions by downward loads or vertical vibrations, thereby readily breaking the coupled portion or portions. In the case where three coupled portions are shifted from one another in a vertical direction, although the coupled portions can enhance a strength against the vertical vibrations and downward loads, an inserting force upon locking will increase, a failure such as half-coupling is likely to be caused, or the coupled portions will be broken by a forced insertion, since three positions must be coupled upon connecting.

In view of the above problems, an object of the embodiment of the present invention is to provide a fixing structure for an electrical junction box and a cassette that can reduce a stress applied to coupled portions between an electrical junction box and a cassette to prevent the coupled portions from being broken.

In order to overcome the above problems, the embodiment of the present invention includes a fixing structure for an electrical junction box and a cassette, the fixing structure being adapted to fix the cassette on a side wall outer surface of the electrical junction box. The cassette is provided on an outer surface with a locking portion and a rib plate that extends in a vertical direction and projects downward adjacent to the locking portion to come into contact with the side wall outer surface of the electrical junction box. The electrical junction box is provided on the side wall outer surface with a counterpart locking portion to be locked on the locking portion of the cassette and with an engaging stepped-portion for receiving a lower end of the rib plate. When the locking portion and the counterpart locking portion are coupled to and locked on one another, the rib plate of the cassette comes into contact with the side wall outer surface of the electrical junction box, and the lower end of the rib plate comes into contact with the engaging stepped-portion to restrict rotation of the cassette coupled to and locked on the electrical junction box.

According to the above construction, it is possible to restrict rotation of the cassette due to vertical loads or vibrations, by providing the cassette on the position adjacent to the locking portion with the rib plate extending in the vertical direction, bringing the outer side surfaces of the rib plate into contact with the side wall outer surface upon coupling, and engaging the lower end of the rib plate with the engaging stepped-portion at the position below the locking portion. Thus, it is possible to reduce a stress to be applied to the coupled portions between the cassette and the electrical junction box and to prevent the coupled portions from being broken. Also, since not only the locking portion but also the rib plate of the cassette are brought into contact with the exterior of the electrical junction box, it is possible to disperse the vibrations onto the coupled sections between the locking portion of the cassette and the counterpart locking portion of the electrical junction box and onto contacting sections between the rib plate of the cassette and the side wall outer surface of the electrical junction box.

Although the receiving surface on the electrical junction box that receives the rib plate is provided on the box casing body in the case where the box lower cover is mounted on the box casing body while the receiving surface is provided on the box casing body in the case where the box casing body is mounted on the box lower cover, the receiving surface may be surfaces continued between the box lower cover and the box casing body to receive the rib plate.

The coupled portions between the electrical junction box and the cassette may be provided on either a single position or a plurality of positions.

In the case where the coupled portions are provided on the plural positions, the coupled portions may be provided on the same axial line, since the rib plate can prevent the cassette from being rotated.

Preferably, a pair of the locking portions are provided on the cassette so that the locking portions are spaced away from each other laterally, and a single rib plate is disposed between the locking portions. The pair of counterpart locking portions are provided on the side wall outer surface of the electrical junction box to be coupled to the locking portions of the cassette, respectively. The engaging stepped-portion is provided on the side wall outer surface between the counterpart locking portions to receive the rib plate. Line segments that interconnect center points of the locking portions and the rib plate define a triangle.

As described above, since the line segments that interconnect center points of the locking portions and the rib plate define a triangle, it is possible to support the cassette at the three points with respect to the electrical junction box, thereby fixing the cassette on the electrical junction box further stably.

Although the rib plate may be disposed at a central part between the pair of locking portions on the cassette or the rib plate may be deviated from the one locking portion and approached to the other locking portion, it will be preferable that clearances are defined between side ends of the locking portions and rib plate in a lateral direction. The locking portions and rib plate may be superimposed in a vertical direction.

The center point of the locking portion on the cassette means a position of the engaging pawl on the locking portion. The center point of the rib plate means a center of gravity in the rib plate. It is preferable that an intersecting angle of the line segments interconnecting the center points of the rib plate and two locking portions is more than 60 degrees. If the intersecting angle is less than 60 degrees, the rib plate is spaced away from the locking portions too much and a load is applied to only the locking portions. This does not contribute in prevention of rotation of the rib plate and dispersing of vibrations.

The intersecting angle may be either an acute angle or an obtuse angle so long as the intersecting angle is more than 60 degrees. The triangle defined by the line segments that interconnect the center points of the locking portions and the rib plate may be a right triangle, an isosceles triangle, or a scalene triangle. That is, the triangle can obtain flexibility in a size in appearance of the locking portions and rib plate and in an arrangement such as a spacing distance between the locking portions and the rib plate, and a distance between the locking portions and can comply with an alteration in layout of the cassette and electrical junction box.

Preferably, a guide is provided on the side wall outer surface of the electrical junction box. The guide extends in a vertical direction to be continued to an upper end of the engaging stepped-portion. Side edges of the rib plate of the cassette are brought into contact with the guide to restrict a horizontal movement of the cassette.

As described above, since the cassette is subject to restriction of the horizontal movement, it is possible to prevent the cassette from rattling relative to the electrical junction box.

Preferably, the electrical junction box includes a box casing body and a box lower cover to be attached to the box casing body. The counterpart locking portions are provided on the box casing body so that the counterpart locking portions are shifted from each other in the vertical direction. The guide and engaging stepped-portion project from the box lower cover between and below the counterpart locking portions. The locking portions for locking the counterpart locking portions are provided on the cassette so that the locking portions are shifted from each other in the vertical direction. The rib plate projects downward from the cassette between the locking portions.

When the locking portions of the cassette are released from the counterpart locking portions of the box casing body, a driver is inserted into the coupled portions to release the locking means. As described above, since the counterpart locking portions of the box casing body are shifted from the locking portions of the cassette in the vertical direction, the rib plate of the cassette is lifted up a little in comparison with the case where these portions are disposed in the horizontal direction. Consequently, it is possible to release the locking without damaging the counterpart locking portions and locking portions. Furthermore, since the vibrations can be readily dispersed to three positions including the pair of locking portions and rib plate, it is possible to prevent the coupled portions from being broken.

It is preferable that the locking pawls to be locked on the box upper and lower covers are provided in the vertical direction on the same axial line of the counterpart locking portions of the box casing body. In this case, it is possible to readily carry out a vertical removing of molds in comparison with the case where the locking pawls are shifted laterally from the counterpart locking portions of the box casing body. This will simplify a molding process, achieve an optimum layout with respect to a lateral direction, and downsize a whole of the casing bodies.

It should be noted that positional relationships with respect to the vertical direction between the locking portions of the cassette and the rib plate and between the counterpart locking portions of the electrical junction box and the guide are not limited to the above embodiment. In the case where the cassette is upward coupled to the electrical junction box, the rib plate and guide may be provided above the locking portions and counterpart locking portions.

If a difference between the vertical positions of the pair of locking portions of the cassette and the counterpart locking portions of the electrical junction box becomes too great, the most part of load will be applied to only an upper part or a lower part. Accordingly, it is preferable that at least parts of the locking portions and counterpart locking portions are superimposed on each other in the vertical direction.

Preferably, the rib plate projecting from the cassette has a rectangular shape and extends in the vertical direction. A pair of engaging pieces project from lateral side end edges of the rib plate to form a T-shape in lateral cross section. The guide projecting from the box lower cover is provided on opposite side ends with a U-shaped portion in lateral cross section to slidably receive the engaging pieces. The engaging stepped-portion is provided between lower ends of the guide.

According to the above construction, since the engaging pieces of the rib plate are fitted into the guide having the U-shaped portions in cross section, it is possible to prevent the rib plate from being half-coupled to the guide and to surely restrict the horizontal movement of the cassette relative to the electrical junction box.

Preferably, the cassette includes a cassette casing body from which the rib plate projects and a cassette lower cover in which an electrical wire threading section projects downward from a bottom wall of the cassette casing body. An opening space is provided from a side wall upper end of the cassette lower cover to a lower end of the electrical wire threading section. A tongue piece extends downward from a lower end of the rib plate of the cassette casing body. The tongue piece is fitted into the opening space in the cassette lower cover to close the opening space.

According to the above construction, it is possible to enhance a strength of the rib plate, since the tongue piece is integrally formed with the rib plate. Even if a great stress is applied to the rib plate that serves as the receiving surface for the electrical junction box, it is possible to prevent the rib plate from being broken. Furthermore, it is possible to combine the electrical wire threading section and rib plate to form an annular configuration, thereby enhancing a guiding function for electrical wires.

According to the above construction, as described above, it is possible to restrict rotation of the cassette due to vertical loads or vibrations, by providing the cassette on the different vertical positions with the rib plate, bringing the outer side surfaces of the rib plate into contact with the side wall outer surface upon coupling, and engaging the lower end of the rib plate with the engaging stepped-portion. Thus, it is possible to reduce a stress to be applied to the coupled portions between the cassette and the electrical junction box and to prevent the coupled portions from being broken.

Also, it is possible to support the cassette at the three points on the electrical junction box and to fix the cassette on the electrical junction box more stably by disposing the single rib plate between the pair of locking portions of the cassette and defining the triangle by the line segments interconnecting the center points of the locking portions of the cassette and rib plate.

Furthermore, since the counterpart locking portions of the box casing body and the locking portions of the cassette are shifted from one another in the vertical direction, the rib plate of the cassette is lifted up a little when the driver is inserted into the coupled portions, in comparison with the case where the portions are disposed in the horizontal direction. Consequently, it is possible to release the locking without damaging the counterpart locking portions and locking portions. In addition, the vibrations are likely to be dispersed on three points including the pair of locking portions and the rib plate, thereby preventing the engaging portions from being broken.

Furthermore, the rib plate is formed into the T-shape in horizontal cross section by projecting the pair of engaging pieces from opposite side end edges of the rib plate and the guide projecting from the cassette lower cover are formed into the U-shape in horizontal cross section to slidably receive the engaging piece. It is possible to prevent the rib plate from being half-coupled to the guide and to surely restrict the horizontal movement of the cassette relative to the electrical junction box.

BRIEF DESCRIPTION OF THE DRAWINGS

An exemplary embodiment will be described below with reference to the drawings, wherein.

DETAILED DESCRIPTION OF EMBODIMENTS

Figure 1A:
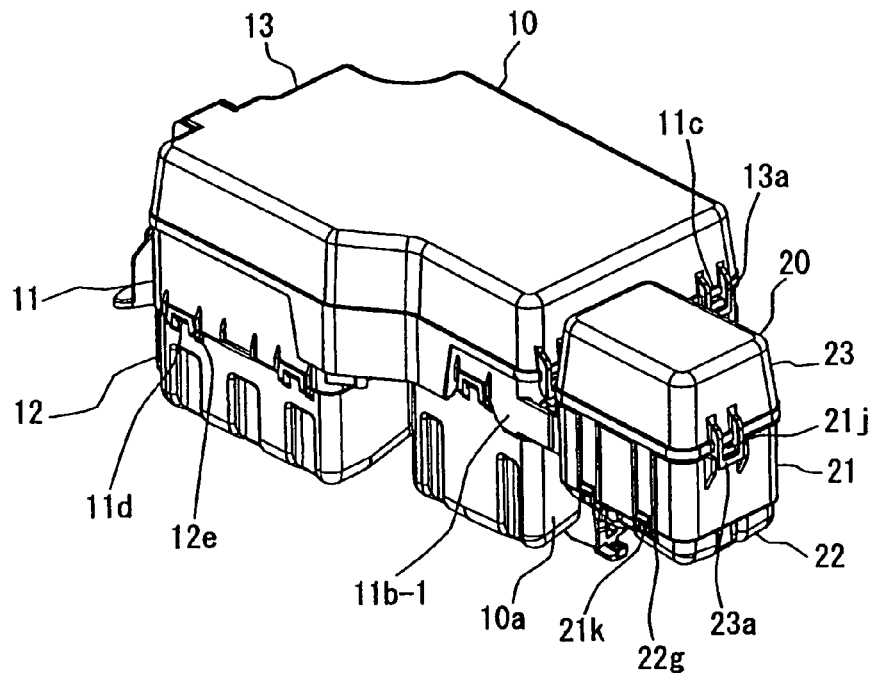
FIG. 1A is a perspective view of a fixing structure for an electrical junction box and a cassette.

An embodiment of a fixing structure for an electrical junction box and a cassette in accordance with the present invention will be described below by referring to the drawings.

FIG. 1A to FIG. 6C show an embodiment of a fixing structure for an electrical junction box 10 and a cassette 20.

FIG. 1A to FIG. 2C show a condition where the cassette 20 is coupled to the electrical junction box 10. The cassette 20 is an additional electrical junction box and coupled to a side wall 10a of the electrical junction box 10.

Figure 3A:
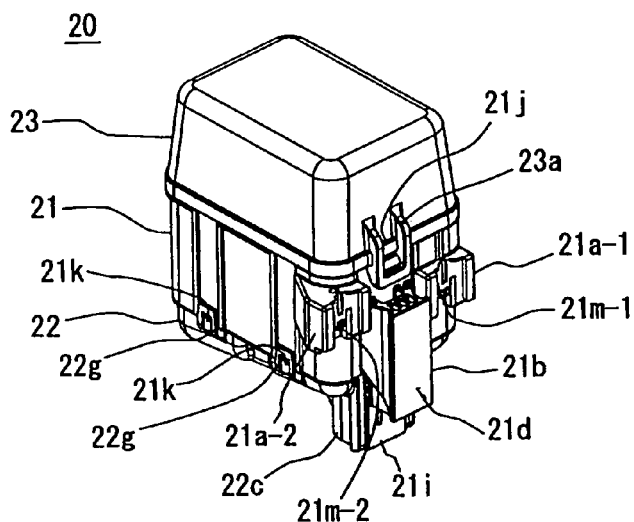
FIG. 3A is a perspective view of a cassette.
Figure 3B:
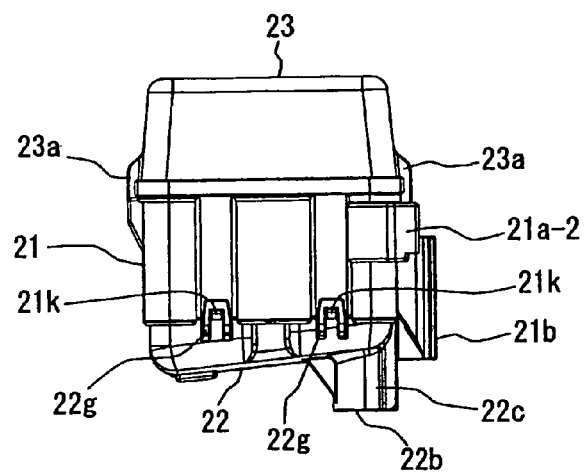
FIG. 3B is a front elevation view of FIG. 3A.
Figure 3C:
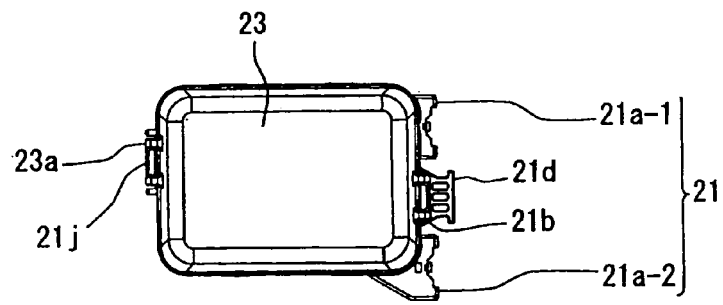
FIG. 3C is a plan view of FIG. 3A.

As illustrated in FIGS. 3A to 3C, the cassette 20 is formed into a box-like configuration and includes a cassette casing body 21 made of a resin product, a cassette lower cover 22 attached to a lower part of the cassette casing body 21, and a cassette upper cover 23 attached to an upper part of the cassette casing body 21. The cassette 20 contains electronic parts (not shown).

Figure 4A:
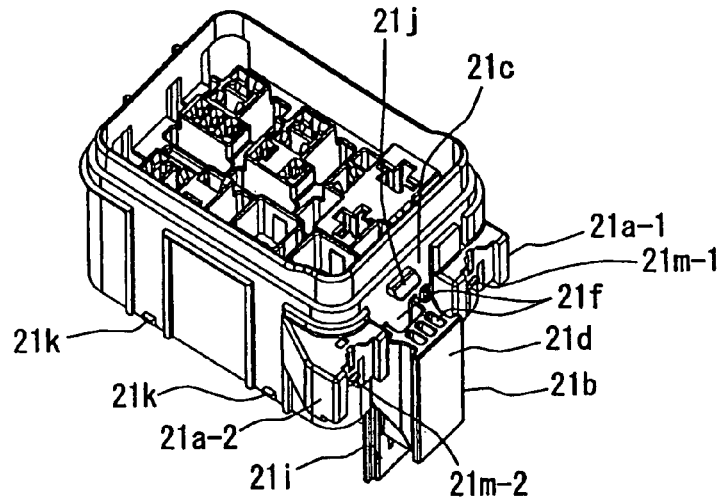
FIG. 4A is a perspective view of a cassette casing body.
Figure 4B:
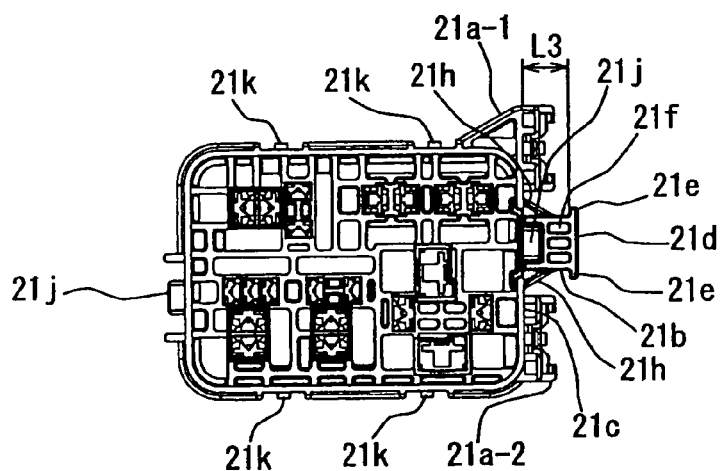
FIG. 4B is a plan view of FIG. 4A.
Figure 4C:
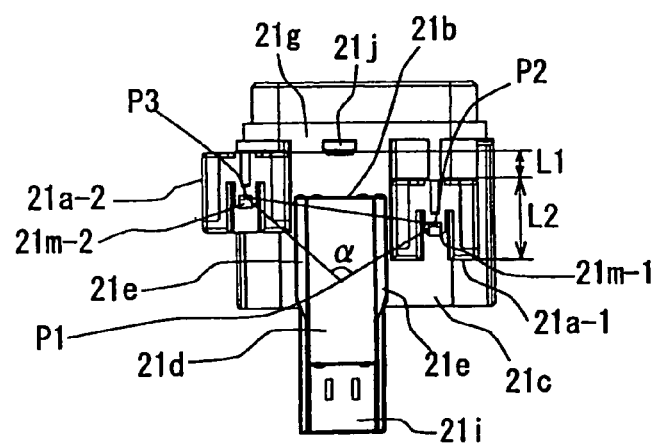
FIG. 4C is a right side elevation view of FIG. 4A.

As illustrated in FIGS. 4A to 4C, a pair of locking portions 21a (21a-1 and 21a-2) are provided on an outer surface of a side wall of the cassette casing body 21 so that the locking portions 21a-1 and 21a-2 are spaced laterally away from each other on the outer surface. The locking portions 21a-1 and 21a-2 are shifted from each other in a vertical direction so that they accord with counterpart locking portions 11b-1 and 11b-2 of a box casing body 11 described later. Pawls 21m-1 and 21m-2 project from central positions of the locking portions 21a-1 and 21a-2, respectively. When the cassette 20 is coupled to the electrical junction box 10, the pawls 21m-1 and 21m-2 engage pawls 11e-1 and 11e-2 (described later) provided on the counterpart locking portions 11b-1 and 11b-2 of the box casing body 11.

The locking portions 21a-1 and 21a-2 and the counterpart locking portions 11b-1 and 11b-2 may be provided on the same positions in the vertical direction, respectively.

A rib plate 21b is projected from the side wall outer surface of the cassette casing body 21 between the locking portions 21a-1 and 21a-2. The rib plate 21b has a rectangular shape in cross section and extends over a lower end of the cassette casing body 21 by a given length in the vertical direction.

The rib plate 21b is projected from a side wall 21c of the cassette casing body 21 by a length L3 (FIG. 4B) in a horizontal direction so that an outer surface of the rib plate 21b comes into contact with the side wall 10a of the electrical junction box 10 when the cassette 20 is coupled to the box 10. The rib plate 21b is provided with an engaging piece 21e on each of right and left end edges corresponding to side ends of the electrical junction box 10 so that the rib plate forms a T-shape in cross section in the horizontal direction.

The rib plate 21b is provided with a plurality of through-holes 21f to reduce a weight of the rib plate 21b and with reinforcement ribs 21h each extending from the side wall of the rib plate 21b to the side wall 21c of the cassette casing body 21.

As illustrated in FIG. 4C, the rib plate 21b and locking portions 21a-1 and 21a-2 are disposed so that line segments interconnecting a center point P1 (center of gravity in the rib plate 21b) and center points P2 and P3 (correspond to pawls 21m-1 and 21m-2 of the locking portions 21a-1 and 21b-2) form a triangle. In the present embodiment, an intersecting angle α between the line segment P1-P2 and the line segment P1-P3 is set to be about 100 degrees.

Figure 5A:
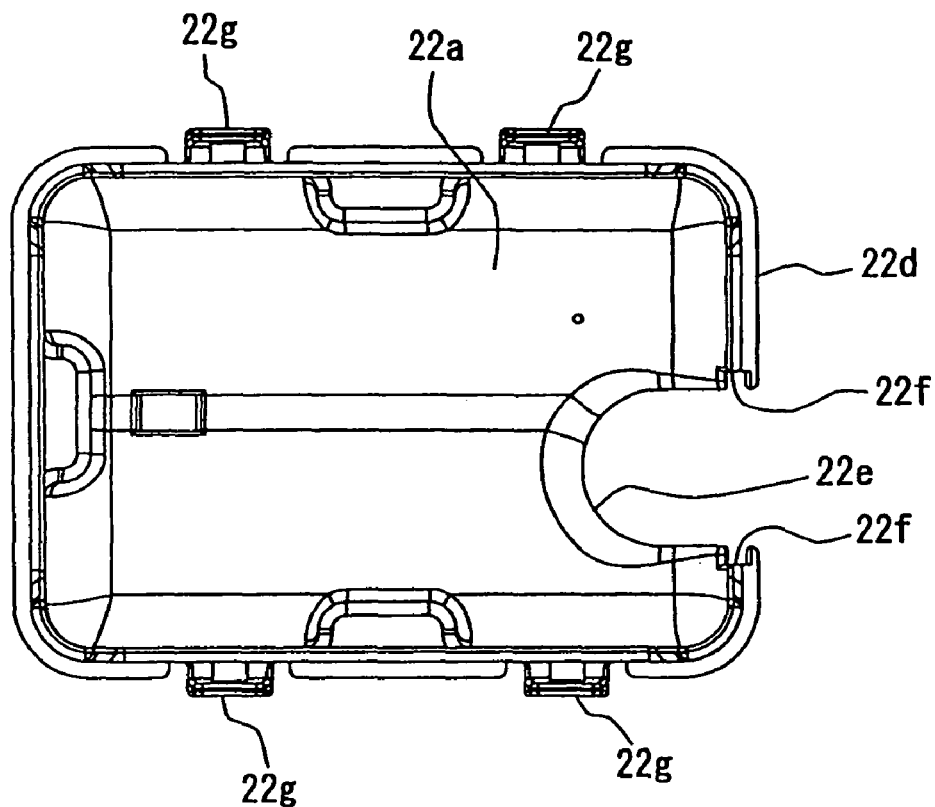
FIG. 5A is a plan view of a cassette lower cover.
Figure 5B:
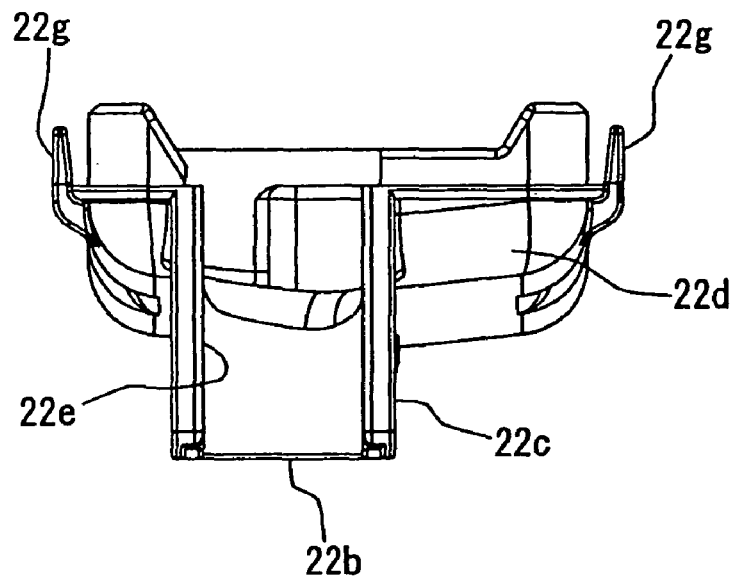
FIG. 5B is a right side elevation view of FIG. 5A.

As illustrated in FIGS. 5A and 5B, an electrical wire threading section 22c extends downward from a bottom wall 22a of the cassette lower cover 22 and is provided on its lower end with an electrical wire threading port 22b. An opening space 22e is provided on a side wall 22d of the cassette lower cover 22 that includes the electrical wire threading section 22c. The opening space 22e extends from an upper end of the side wall 22d to a lower end of the electrical wire threading section 22c. Before the cassette lower cover 22 is coupled to the cassette casing body 21, electrical wires (not shown) are threaded into the opening space 22e.

The opening space 22e is provided on each of opposed ends with a groove 22f having a U-shape in cross section. A tongue piece 21i (described later) of the cassette casing body 21 is slidably engaged in the grooves 22f.

On the other hand, the tongue piece 21i extends downward from the lower end of the cassette casing body 21 at the inside of the rib plate 21b. A lower end of the tongue piece 21i extends downward over the lower end of the rib plate 21b. The tongue piece 21i is fitted into the grooves 22f in the opening space 22e in the cassette lower cover 22 to close the opening space 21e at its side part.

Locking frames 23a and 22g (FIG. 3A) are provided on a side wall lower end of the cassette upper cover 23 and on a side wall upper end of the cassette casing body 21 so that the locking frames 23a and 22g are spaced away from each other by a given distance. The cassette casing body 21 is provided on its side wall upper and lower ends with locking pawls 21j and 21k adapted to be engaged with the locking frames 23a and 22g.

Figure 1B:
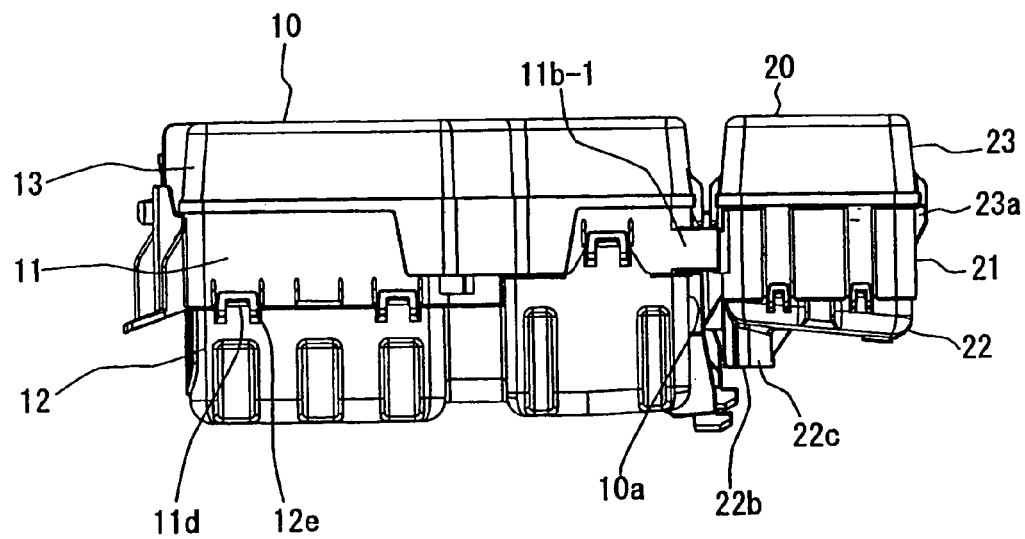
FIG. 1B is a front elevation view of FIG. 1A.
Figure 2A:
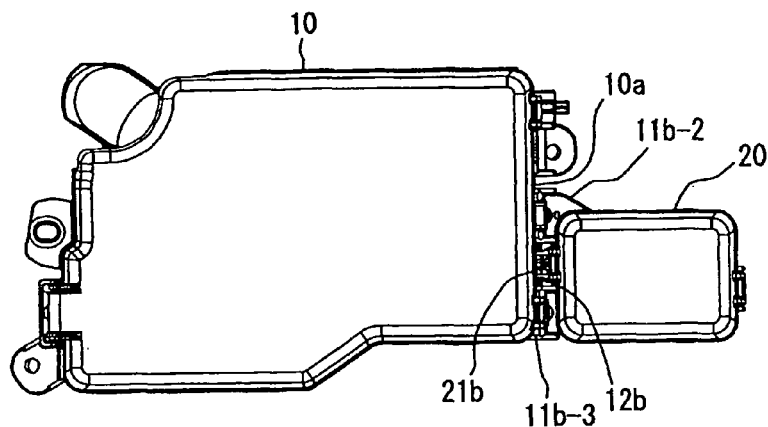
FIG. 2A is a plan view of FIG. 1A.
Figure 2B:
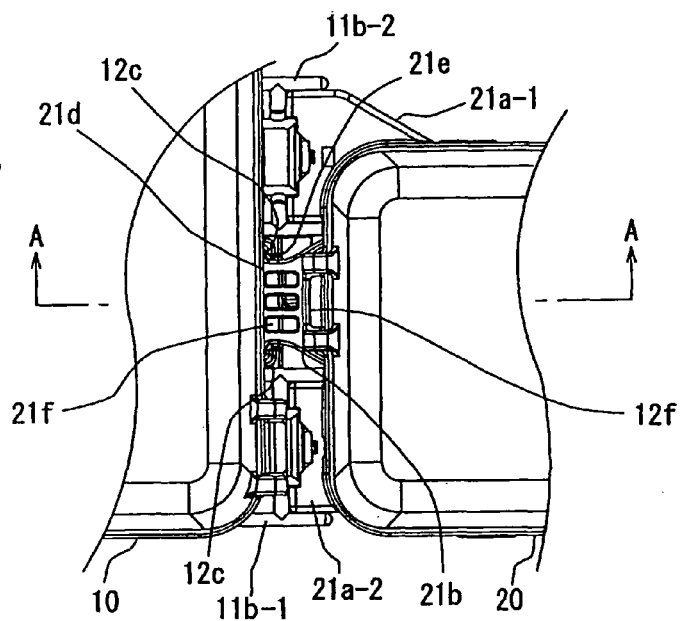
FIG. 2B is an enlarged plan view of a main part shown in FIG. 2A.
Figure 2C:
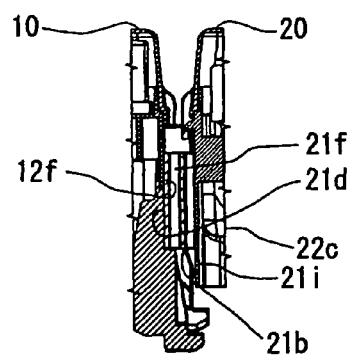
FIG. 2C is a cross section view of the structure taken along lines A-A in FIG. 2B.

The electrical junction box 10 adapted to support the cassette 20 is made of a resin molding product. As shown in FIGS. 1A and 1B, the electrical junction box 10 includes a box casing body 11, a box lower cover 12 attached to a lower part of the box casing body 11, and a box upper cover 13 mounted on an upper surface of the box casing body 11. A side wall 10a of the electrical junction box 10 defines a receiving surface that extends from the box casing body 11 to the box lower cover 12 to support the cassette 20 thereon.

Figure 6A:
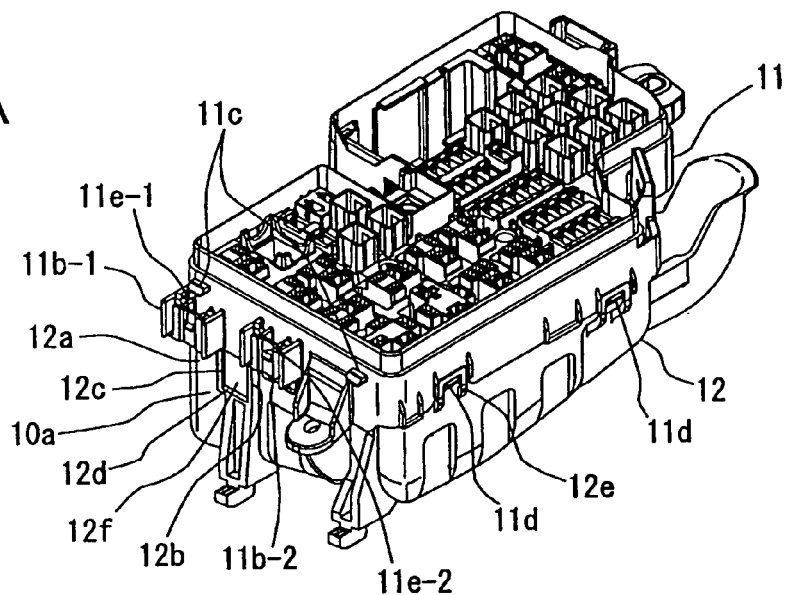
FIG. 6A is a perspective view of the electrical junction box, illustrating a condition where a box casing body and a box lower cover are assembled in the electrical junction box.
Figure 6B:
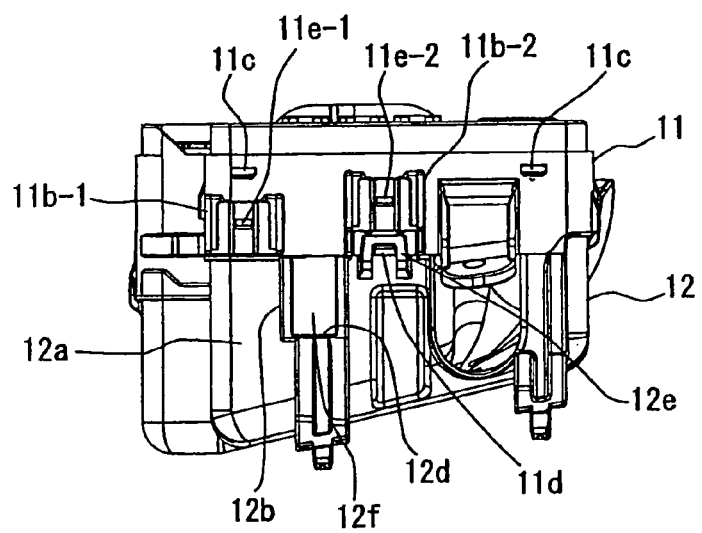
FIG. 6B is a front elevation view of FIG. 6A.
Figure 6C:
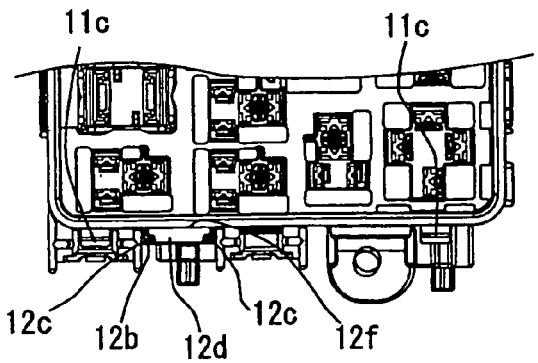
FIG. 6C is an enlarged plan view of a main part of the electrical junction box shown in FIG. 6A.
Figure 7A:
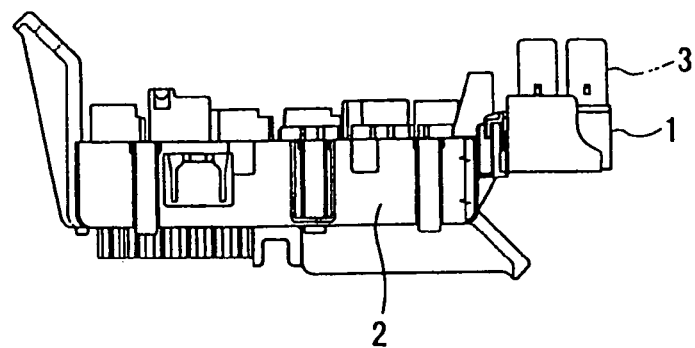
FIG. 7A is a front elevation view of a prior art electrical junction box to which a prior art additional electrical junction box is attached.
Figure 7B:
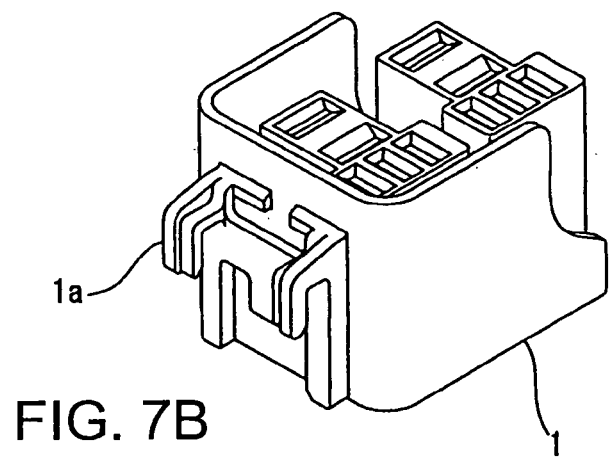
FIG. 7B is a perspective view of the prior art additional electrical junction box shown in FIG. 7A.
Figure 7C:
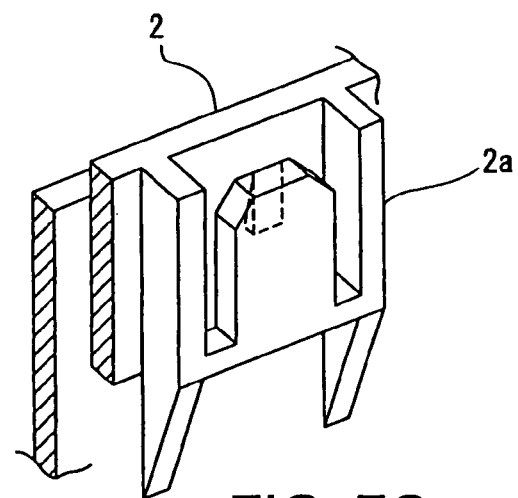
FIG. 7C is an enlarged perspective view of a main part of the prior art electrical junction box shown in FIG. 7A.

As illustrated in FIGS. 6A to 6C, the box casing body 11 is provided on the outer surface of the side wall 10a with the counterpart locking portions 11b-1 and 11b-2 to be coupled to the pair of locking portions 21a and 21a of the cassette 20. The counterpart locking portions 11b-1 and 11b-2 project from the outer surface of the side wall 10a to be spaced away from each other in the lateral direction. The counterpart locking portions 11b-1 and 11b-2 are provided on their central parts with pawls 11e-1 and 11e-2 to be engaged with the pawls 21m-1 and 21m-2 of the locking portions 21a-1 and 21a-2 of the cassette 20, respectively.

The one portion being locked 11b-1 is provided on an upper position on the same vertical axial line with a locking pawl 11c (described later) to be locked on a locking frame 13a (described later) of the box upper cover 13. The other portion being locked 11b-2 is provided on a lower position on the same vertical axial line with a locking pawl 11d (described later) to be locked on the box lower cover 12. The one portion being locked 11b-1 is disposed below the other portion being locked 11b-2 so that the counterpart locking portions 11b-1 and 11b-2 are shifted from each other in the vertical direction.

A guide 12b projects from an outer surface of a side wall 12a of the lower cover 12 so that the guide 12b is disposed below an intermediate position between the counterpart locking portions 11b-1 and 11b-2 of the box casing body 11, when the box lower cover 12 is mounted on the box casing body 11.

The guide 12b is provided with a pair of protrusions 12c having a U-shape in cross section taken from a horizontal direction. The protrusions 12c extend in a vertical direction and slidably receive the engaging piece 21e of the rib plate 21b of the cassette 20. A surface between the pair of protrusions 12c defines a receiving surface 12f with which an outer side surface 21d of the rib plate 21b of the cassette 20 comes into contact.

Since the rib plate 21b is longer than the protrusions 12c in the vertical direction in the present invention, the outer side surface 21d of the rib plate 21b extends from the receiving surface 12f of the guide 12b to the box casing body 11, when the cassette 20 is coupled to the electrical junction box 10. That is, the outer side surface 21d of the rib plate 21b comes into contact with a surface continued between the box casing body 11 and the box lower cover 12.

An engaging stepped-portion 12d is provided on a lower end of the guide 12b so as to be continued to the guide 12b. A lower end surface of the rib plate 21b comes into contact with the engaging stepped-portion 12d, when the cassette 20 is coupled to the electrical junction box 10.

Locking frames 13a and 12e are provided on a lower end of a side wall of the box upper cover 13 and an upper end of a side wall of the box lower cover 12 so that the locking frames 13a and 12e are spaced away from each other. Locking pawls 11c and 11d are provided on upper and lower ends of a side wall of the box casing body 11 so that the locking pawls 11c and 11d engage the locking frames 13a and 12e.

According to the above construction, when the cassette 20 is coupled to the electrical junction box 10, the outer side surface 21d of the rib plate 21b comes into contact with the box casing body 11 of the electrical junction box 10 and the side wall 10a of the box lower cover 12. The lower end of the rib plate 21b comes into contact with the engaging stepped-portion 12d. Consequently, it is possible to suppress rotation of the cassette 20 caused by vertical loads or vibrations. Accordingly, it is possible to reduce a stress caused by rotation of the cassette 20 generated by loads on the locking portions 21a of the cassette 20 and counterpart locking portions 11b-1 and 11b-2 of the electrical junction box 10, thereby preventing the coupled portions from being broken.

Since the counterpart locking portions 11b-1 and 11b-2 of the box casing body 11 are shifted from the locking portions 21a-1 and 21a-2 of the cassette 20 in the vertical direction, the rib plate 21b is moved up slightly from the box casing body 11 when a driver is inserted into the coupled portions to release the locking means, thereby releasing the locking means without damaging the coupled portions. Furthermore, since the vibrations are easily distributed at the three points of the locking portions 21a-1, 21a-2, and rib plate 21b, it is possible to prevent the coupled portions from being broken. In addition, since the locking pawls 11c and 11d that interconnect the box upper cover 13 and box lower cover 12 are provided on the same vertical axial line of the counterpart locking portions 11b-1 and 11b-2 of the box casing body 11, it is possible to carry out vertical removing of molds, thereby making it easy to perform a molding process. Since an optimum layout can be obtained in the lateral direction, it is possible to downsize the whole of the casing bodies.

Furthermore, since the pair of locking portions 21a of the cassette 20 and the rib plate 21b are arranged on the triangular positions and the cassette 20 is supported on the box casing body 11 at three points, it is possible to stably fix the cassette 20 on the electrical junction box 10.

Also, since the engaging piece 21e of the rib plate 21b of the cassette 20 is fitted onto the guide 12b of the electrical junction box 10, it is possible to prevent the rib plate 21b from being half-coupled to the guide 12b and to positively limit the movement of the cassette 20 relative to the electrical junction box 10 in the horizontal direction. Since the tongue piece 21i projects from the rib plate 21b to be fitted on the box lower cover 12, it is possible to enhance a strength of the rib plate 21b, thereby preventing the rib plate 21b from being broken, even if a great load is applied to the coupled portions between the cassette 20 and the electrical junction box 10 and a great stress is applied to the outer side surface 21d of the rib plate 21b that comes into contact with the side wall 10a of the electrical junction box 10.

What is claimed is:

1. A fixing structure for an electrical junction box and a cassette, the fixing structure being adapted to fix the cassette on a side wall outer surface of the electrical junction box, the fixing structure comprising:
   a pair of locking portions provided on an outer surface of the cassette;
   a rib plate that extends in a vertical direction and projects downward adjacent to the locking portions to come into contact with the side wall outer surface of the electrical junction box;
   a pair of counterpart locking portions to be locked on the locking portions provided on the side wall outer surface of the electrical junction box; and
   an engaging stepped-portion provided on the side wall outer surface of the electrical junction box that receives a lower end of the rib plate,
   wherein when the locking portions and the counterpart locking portions are coupled to and locked on one another, the rib plate comes into contact with the side wall outer surface of the electrical junction box, and a lower end of the rib plate comes into contact with the engaging stepped-portion to restrict rotation of the cassette coupled to and locked on the electrical junction box;
   the locking portions are spaced away from each other laterally, and a single rib plate is disposed between the locking portions;
   the counterpart locking portions are provided on the side wall outer surface of the electrical junction box to be coupled to the locking portions on the cassette, respectively, and the engaging stepped-portion is provided on the side wall outer surface between the counterpart locking portions to receive the rib plate; and
   wherein line segments that interconnect center points of the locking portions and the rib plate define a triangle.

2. The fixing structure for the electrical junction box and the cassette, according to claim 1, wherein a guide is provided on the side wall outer surface of the electrical junction box, the guide extends in a vertical direction to be continued to an upper end of the engaging stepped-portion, and side edges of the rib plate of the cassette are brought into contact with the guide to restrict a horizontal movement of the cassette.

3. The fixing structure for the electrical junction box and the cassette, according to claim 2, wherein:
   the electrical junction box includes a box casing body and a box lower cover to be attached to the box casing body;
   the counterpart locking portions are provided on the box casing body so that the counterpart locking portions are shifted from each other in the vertical direction, and the guide and engaging stepped-portion project from the box lower cover between and below the counterpart locking portions; and
   the locking portions for locking the counterpart locking portions are provided on the cassette so that the locking portions are shifted from each other in the vertical direction, and the rib plate projects downward from the cassette between the locking portions.

4. The fixing structure for the electrical junction box and the cassette, according to claim 3, wherein:
   the rib plate projecting from the cassette has a rectangular shape and extends in the vertical direction, and a pair of engaging pieces project from lateral side end edges of the rib plate to form a T-shape in lateral cross section; and
   the guide projecting from the box lower cover is provided on opposite side ends with a U-shaped portion in lateral cross section to slidably receive the engaging pieces, and the engaging stepped-portion is provided between lower ends of the guide.

5. A fixing structure for an electrical junction box and a cassette, according to claim 4, wherein:
   the cassette includes a cassette casing body from which the rib plate projects and a cassette lower cover in which an electrical wire threading section projects downward from a bottom wall of the cassette casing body, and an opening space is provided from a side wall upper end of the cassette lower cover to a lower end of the electrical wire threading section; and
   a tongue piece extends downward from a lower end of the rib plate of the cassette casing body, and the tongue piece is fitted into the opening space in the cassette lower cover to close the opening space.

6. The fixing structure for the electrical junction box and the cassette, according to claim 1, wherein:
   the cassette includes a cassette casing body from which the rib plate projects and a cassette lower cover in which an electrical wire threading section projects downward from a bottom wall of the cassette casing body, and an opening space is provided from a side wall upper end of the cassette lower cover to a lower end of the electrical wire threading section; and
   a tongue piece extends downward from a lower end of the rib plate of the cassette casing body, and the tongue piece is fitted into the opening space in the cassette lower cover to close the opening space.

7. A fixing structure for an electrical junction box and a cassette, according to claim 2, wherein:
   the cassette includes a cassette casing body from which the rib plate projects and a cassette lower cover in which an electrical wire threading section projects downward from a bottom wall of the cassette casing body, and an opening space is provided from a side wall upper end of the cassette lower cover to a lower end of the electrical wire threading section; and
   a tongue piece extends downward from a lower end of the rib plate of the cassette casing body, and the tongue piece is fitted into the opening space in the cassette lower cover to close the opening space.

8. A fixing structure for an electrical junction box and a cassette, according to claim 3, wherein:
   the cassette includes a cassette casing body from which the rib plate projects and a cassette lower cover in which an electrical wire threading section projects downward from a bottom wall of the cassette casing body, and an opening space is provided from a side wall upper end of the cassette lower cover to a lower end of the electrical wire threading section; and
   a tongue piece extends downward from a lower end of the rib plate of the cassette casing body, and the tongue piece is fitted into the opening space in the cassette lower cover to close the opening space.

9. A fixing structure for an electrical junction box and a cassette, the fixing structure being adapted to fix the cassette on a side wall outer surface of the electrical junction box, the fixing structure comprising:
   a locking portion provided on an outer surface of the cassette;
   a rib plate that extends in a vertical direction and projects downward adjacent to the locking portion to come into contact with the side wall outer surface of the electrical junction box;

a counterpart locking portion to be locked on the locking portion provided on the side wall outer surface of the electrical junction box; and an engaging stepped-portion provided on the side wall outer surface of the electrical junction box that receives a lower end of the rib plate, wherein when the locking portion and the counterpart locking portion are coupled to and locked on one another, the rib plate comes into contact with the side wall outer surface of the electrical junction box, and a lower end of the rib plate comes into contact with the engaging stepped-portion to restrict rotation of the cassette coupled to and locked on the electrical junction box, and wherein a guide is provided on the side wall outer surface of the electrical junction box, the guide extends in a vertical direction to be continued to an upper end of the engaging stepped-portion, and side edges of the rib plate of the cassette are brought into contact with the guide to restrict a horizontal movement of the cassette.

10. The fixing structure for the electrical junction box and the cassette, according to claim 9, wherein:

the electrical junction box includes a box casing body and a box lower cover to be attached to the box casing body;

a pair of counterpart locking portions are provided on the box casing body so that the counterpart locking portions are shifted from each other in the vertical direction, and the guide and engaging stepped-portion project from the box lower cover between and below the counterpart locking portions; and a pair of locking portions for locking the counterpart locking portions are provided on the cassette so that the locking portions are shifted from each other in the vertical direction, and the rib plate projects downward from the cassette between the locking portions.

11. The fixing structure for the electrical junction box and the cassette, according to claim 10, wherein:

the rib plate projecting from the cassette has a rectangular shape and extends in the vertical direction, and a pair of engaging pieces project from lateral side end edges of the rib plate to form a T-shape in lateral cross section; and the guide projecting from the box lower cover is provided on opposite side ends with a U-shaped portion in lateral cross section to slidably receive the engaging pieces, and the engaging stepped-portion is provided between lower ends of the guide.

12. The fixing structure for the electrical junction box and the cassette, according to claim 11, wherein:

the cassette includes a cassette casing body from which the rib plate projects and a cassette lower cover in which an electrical wire threading section projects downward from a bottom wall of the cassette casing body, and an opening space is provided from a side wall upper end of the cassette lower cover to a lower end of the electrical wire threading section; and a tongue piece extends downward from a lower end of the rib plate of the cassette casing body, and the tongue piece is fitted into the opening space in the cassette lower cover to close the opening space.

13. The fixing structure for the electrical junction box and the cassette, according to claim 10, wherein:

the cassette includes a cassette casing body from which the rib plate projects and a cassette lower cover in which an electrical wire threading section projects downward from a bottom wall of the cassette casing body, and an opening space is provided from a side wall upper end of the cassette lower cover to a lower end of the electrical wire threading section; and a tongue piece extends downward from a lower end of the rib plate of the cassette casing body, and the tongue piece is fitted into the opening space in the cassette lower cover to close the opening space.

14. The fixing structure for the electrical junction box and the cassette, according to claim 9, wherein:

the cassette includes a cassette casing body from which the rib plate projects and a cassette lower cover in which an electrical wire threading section projects downward from a bottom wall of the cassette casing body, and an opening space is provided from a side wall upper end of the cassette lower cover to a lower end of the electrical wire threading section; and a tongue piece extends downward from a lower end of the rib plate of the cassette casing body, and the tongue piece is fitted into the opening space in the cassette lower cover to close the opening space.

15. A fixing structure for an electrical junction box and a cassette, the fixing structure being adapted to fix the cassette on a side wall outer surface of the electrical junction box, the fixing structure comprising:

a locking portion provided on the outer surface of the cassette;

a rib plate that extends in a vertical direction and projects downward adjacent to the locking portion to come into contact with the side wall outer surface of the electrical junction box;

a counterpart locking portion to be locked on the locking portion provided on the side wall outer surface of the electrical junction box; and an engaging stepped-portion provided on the side wall outer surface of the electrical junction box that receives a lower end of the rib plate, wherein when the locking portion and the counterpart locking portion are coupled to and locked on one another, the rib plate comes into contact with the side wall outer surface of the electrical junction box, and a lower end of the rib plate comes into contact with the engaging stepped-portion to restrict rotation of the cassette coupled to and locked on the electrical junction box, the cassette includes a cassette casing body from which the rib plate projects and a cassette lower cover in which an electrical wire threading section projects downward from a bottom wall of the cassette casing body, and an opening space is provided from a side wall upper end of the cassette lower cover to a lower end of the electrical wire threading section; and a tongue piece extends downward from a lower end of the rib plate of the cassette casing body, and the tongue piece is fitted into the opening space in the cassette lower cover to close the opening space.

* * * * *